3,769,343
p,p'-OXYBIS(BENZENESULFONAMIDE) MONOHYDRATE

Shirley H. Roth, Highland Park, N.J., assignor to Cities Service Company, New York, N.Y.
No Drawing. Filed Nov. 5, 1971, Ser. No. 196,228
Int. Cl. C07c 43/78
U.S. Cl. 260—556 AR                      1 Claim

ABSTRACT OF THE DISCLOSURE p,p'-Oxybis(benzensulfonamide) monohydrate is a novel compound which may be prepared by treating p,p'-oxybis(benzenesulfonyl chloride) with ammonium hydroxide. It is useful as an intumescent agent.

BACKGROUND OF THE INVENTION

Field of the invention

This invention resides in a new compound, i.e., p,p'-oxybis(benzenesulfonamide) monohydrate.

Description of the prior art

Anhydrous p,p'-oxybis(benzenesulfonamide) is a known compound which has a melting point of about 159° C. [See Ernest H. Huntress and Frederick H. Carten, "Indentification of Organic Compounds (III), Chlorosulfonic Acid as a Reagent for the Characterization of Aromatic Ethers," Journal of the American Chemical Society, vol. 62, pp. 603–604 (1940).]

As disclosed in my copending application S.N. 196,229, filed Nov. 5, 1971, compounds such as p,p'-oxybis(benzenssulfonamide) are useful as intumescent agents. It has been found that the known anhydrous form of p,p'-oxybis(benzenesulfonamide) is valuable in this application; but that its moisture sensitivity, although not unduly high, is higher than might sometimes be desired.

SUMMARY OF THE INVENTION

An object of this invention is to provide a novel compound.

Another object is to provide a novel compound having low moisture sensitivity and having utility as an intumescent agent.

These and other objects are attained in p,p'-oxybis(benzenesulfonamide) monohydrate.

DESCRIPTION OF THE PREFERRED EMBODIMENTS p,p'-Oxybis(benzenesulfonamide) monohydrate is a new compound which has a melting point of about 184° C. It may be prepared by reacting p,p'-oxybis(benzenesulfonyl chloride) with an excess of concentrated ammonium hydroxide in an amount sufficient to maintain a basic reaction medium at a temperature in the range of about 20–100° C. for about 1–1440 minutes. During the reaction it is sometimes desirable to add water to maintain a viscosity suitable for stirring. After the reaction has been completed, the product is recovered, washed, and dried by conventional techniques.

The new compound has low moisture sensitivity, e.g., a solubility of only 0.04 g./100 g. of water at 20° C., and is useful as an intumescent agent, as disclosed in my aforementioned copending application.

The following example is given to illustrate the invention.

EXAMPLE

Add 3600 g. of p,p'-oxybis(benzenesulfonyl chloride) with stirring to 9600 ml. of concentrated ammonium hydroxide. Heat the reaction mixture to 70° C., and maintain this temperature for 30 minutes. Then cool the reaction mixture in an ice bath, and add sulfuric acid until the reaction mixture is acid to Congo Red test paper. Vacuum filter the product, slurry it in hot water for one hour at 80° C., refilter it, and dry it under vacuum at 60° C. After being exposed to the atmosphere for two hours, the purified product is found to have a melting point of about 184° C., a nitrogen content of 8.06%, and a sulfur content of 18.21%. After being redried and kept in an unhydrated condition, the product has a carbon content of 43.55%, a hydrogen content of 3.9%, and an oxygen content of 24.76%.

What is claimed is:
1. p,p'-Oxybis(benzenesulfonamide) monohydrate.

References Cited
UNITED STATES PATENTS
2,671,771   3/1954   Simons _____ 260—49

OTHER REFERENCES
JACS 62: 603–604 (1940), Huntress et al.

HENRY R. JILES, Primary Examiner
S. D. WINTERS, Assistant Examiner

U.S. Cl. X.R.
260—543 R; 117—136